(12) United States Patent
Aisa et al.

(10) Patent No.: US 8,991,221 B2
(45) Date of Patent: Mar. 31, 2015

(54) HOUSEHOLD APPLIANCE FOR TREATING SOFT GOODS WITH DISPLACEMENT SENSOR

(75) Inventors: Valerio Aisa, Fabriano (IT); Paolo Santonicola, Fabriano (IT); Giovanni Bombardieri, Albino (IT); Costantino Mariotti, Sigillo (IT); Federica Minni, Falconara Marittima (IT)

(73) Assignee: Indesit Company S.p.A., Fabriano (IT)

( * ) Notice: Subject to any disclaimer, the term of this patent is extended or adjusted under 35 U.S.C. 154(b) by 1579 days.

(21) Appl. No.: 11/991,817

(22) PCT Filed: Jul. 20, 2006

(86) PCT No.: PCT/IB2006/002002
§ 371 (c)(1), (2), (4) Date: Mar. 10, 2008

(87) PCT Pub. No.: WO2007/031821
PCT Pub. Date: Mar. 22, 2007

(65) Prior Publication Data
US 2010/0218564 A1 Sep. 2, 2010

(30) Foreign Application Priority Data
Sep. 14, 2005 (IT) .............................. TO2005A0623

(51) Int. Cl.
*D06F 29/00* (2006.01)
*D06F 37/20* (2006.01)
(Continued)

(52) U.S. Cl.
CPC .............. *D06F 37/20* (2013.01); *D06F 39/003* (2013.01); *F16F 7/09* (2013.01); *F16F 9/3292* (2013.01)
USPC .......................................... 68/23.1; 68/12.04

(58) Field of Classification Search
CPC ............ F16F 9/3292; F16F 7/09; D06F 37/20
USPC ........................ 68/12.04, 23.1, 23.2, 23.3, 24
See application file for complete search history.

(56) References Cited

U.S. PATENT DOCUMENTS 3,266,001 A * 8/1966 Waseleski, Jr. et al. .... 338/22 R
3,674,419 A * 7/1972 Tichy ............................... 8/158
(Continued)

FOREIGN PATENT DOCUMENTS

DE 8905566 6/1989
DE 4319614 8/1994
(Continued)

*Primary Examiner* — David Cormier
(74) *Attorney, Agent, or Firm* — Cesari and McKenna, LLP (57) ABSTRACT

The present description relates to a household appliance for treating soft goods, in particular a laundry washing or washing/drying machine of the electronically controlled type fitted with an electronic control system (17). The household appliance comprises an oscillating assembly connected to the frame by means of a suspension system comprising at least one damper (1). The damper (1) comprises two elements (3, 4) adapted to move reciprocally, at least one magnetic element, preferably a permanent magnet (9), and an electronic module (6) provided with at least one magnetic sensor, preferably a Hall element (12). The magnetic element (9) and the magnetic sensor (12) are housed in the damper (1) so as to detect the reciprocal motion of the two elements (3, 4). The electronic module (6) also comprises a microcontroller (16) connected to the magnetic sensor (12) and adapted to generate at least one piece of information, in particular at least one piece of information being representative of the value of the displacement of the oscillating assembly with respect to the frame, and to send said information to the electronic control system (17) over a digital communication line.

25 Claims, 2 Drawing Sheets

(51) Int. Cl.
*D06F 39/00* (2006.01)
*F16F 7/09* (2006.01)
*F16F 9/32* (2006.01)

(56) References Cited

U.S. PATENT DOCUMENTS 3,828,326 A * 8/1974 Cash ............................ 710/262
4,428,088 A * 1/1984 Getz et al. ........................ 8/158
5,619,133 A * 4/1997 Shank et al. ............. 324/207.24
6,564,694 B2 * 5/2003 Zumberge et al. .............. 92/5 R
2001/0011353 A1* 8/2001 Little et al. .................... 713/200
2003/0029205 A1* 2/2003 Dawe ........................... 68/12.06

FOREIGN PATENT DOCUMENTS

| | | |
|---|---|---|
| EP | 0972874 | 1/2000 |
| EP | 1258556 | 11/2002 |
| FR | 2169039 | 9/1973 |

* cited by examiner

Fig.2

HOUSEHOLD APPLIANCE FOR TREATING SOFT GOODS WITH DISPLACEMENT SENSOR

RELATED APPLICATIONS

The present application is a 371 of International Application No. PCT/IB2006/002002 filed Jul. 20, 2006 by Indesit Company S.P.A. for a HOUSEHOLD APPLIANCE FOR TREATING SOFT GOODS WITH DISPLACEMENT SENSOR, which is hereby incorporated by reference in its entirety.

DESCRIPTION

The present invention relates to a household appliance for treating soft goods, preferably a laundry washing or washing/drying machine, according to the preamble of claim 1.

Several typologies of sensing devices are available for the household appliances currently available on the market adapted to measure the relative displacement of the oscillating assembly (i.e. tub assembly, if the household appliance is a laundry washing or washing/drying machine) with respect to the appliance frame, in order to detect, for example, the mass or weight of the laundry being present inside the appliance and/or the value of any load imbalance during the operation of the appliance. Said sensing devices are often built in one of the commonly used mechanical components of the household appliance.

If the household appliance is a laundry washing or washing/drying machine, the sensing devices used for measuring the relative displacement of the oscillating assembly with respect to the appliance frame may suitably be mounted to one of the dampers comprised in the suspension system of the appliance. In such a case, the relative displacement between the rod and the sheath of the damper is used to detect the relative displacement of the oscillating assembly with respect to the frame.

In order to measure said relative displacement between rod and sheath, it is possible to exploit the Hall effect. Patent DE4319614C1 describes a front-loading laundry washing or washing/drying machine with an oscillating assembly suspended on two springs and connected to the frame through two dampers. On one damper, a Hall-effect sensing device is mounted which is sensitive to the relative displacement between the two elements of the damper (rod and sheath). A permanent magnet is secured to the end of the sheath, while a strip mounted to the rod comprises a Hall-effect element located in the area corresponding to the center of the permanent magnet. The sheath is integral with the oscillating assembly, and therefore any movement thereof causes a simultaneous displacement of the permanent magnet.

The displacement of the permanent magnet is detected by the Hall element through the generation of an electric signal, which is then sent by the Hall element to the central controller of the laundry washing or washing/drying machine through a dedicated electric wiring. The Applicant has found that the signal/noise ratio of the electric signal emitted by the Hall sensor may significantly decrease along the path from the Hall element to the central controller, since said electric signal is an analog signal having small dynamics and being subject to considerable noise (i.e. susceptibility problems due to the presence of reactive electric loads inside the household appliance). The longer the electric cable connecting the Hall element to the central controller, the greater the reduction of said signal/noise ratio, which causes much uncertainty in the subsequent quantification of the displacement of the oscillating assembly with respect to the frame (in fact, the displacement of the oscillating assembly with respect to the frame is quantified by the central controller only on the basis of the electric signal received from the Hall element). Such substantial uncertainty does not allow to obtain, through the front-loading laundry washing or washing/drying machine described in patent DE4319614C1, sufficiently reliable and accurate measurements of the relative displacement of the oscillating assembly with respect to the frame, unless the Hall element is connected to the central controller by means of expensive shielded cables.

In patent DE4319614C1, the processing of the electric signal being representative of the relative displacement of the oscillating assembly with respect to the frame is totally carried out by the central controller, which must perform a series of calculation steps aimed at obtaining the value of the relative displacement of the oscillating assembly with respect to the frame starting from said electric signal received from the Hall element. The Applicant has found that said calculation steps place a substantial load on the central controller, which is also forced to perform, in addition to the normal functions for controlling the laundry washing or washing/drying machine, an additional function for processing the electric signal sent by the Hall element, which typically also requires the central controller to carry out a calibration process involving a software workload that may cause the whole system for measuring the relative displacement of the oscillating assembly with respect to the frame to become critical.

Moreover, the measurement system described in patent DE4319614C1 does not take into account the influence of possible external interference factors on the displacement measurements, such as temperature variations in the position of the Hall element, or elasticity and/or damping variations in the suspension system of the household appliance.

The general object of the present invention is to overcome the drawbacks of the prior art, in particular the above-mentioned drawbacks of the measurement system described in patent DE4319614C1.

The general idea at the basis of the present invention is to provide an electronic module comprising at least one magnetic sensor, preferably at least one Hall element, and producing a digital output signal instead of an analog one.

Said electronic module is characterized by a local processing of the output signal of the magnetic sensor and in that, according to an advantageous embodiment of the present invention aimed at ensuring higher measurement accuracy and reliability over time, said local processing can take into account one or more external interference factors adversely affecting the quality of the measurement of the relative displacement of the oscillating assembly with respect to the appliance frame.

The household appliance according to the present invention will become apparent, together with its further advantages, from the following detailed description and from the annexed schematic drawings, which are supplied by way of non-limiting example, wherein.

A household appliance, in particular a laundry washing or washing/drying machine, according to the present invention comprises a frame and an oscillating assembly, in turn comprising a drum adapted to house soft goods to be treated and to be rotated about its axis by means of a motor device, and a tub adapted to contain water and/or wash liquid used for performing the treatment. A suspension system keeps the oscillating assembly suspended, connecting it to the frame. Said household appliance also comprises an electronic control system with a central controller 17, and possibly an interface device adapted to provide information to the user of the household appliance. Said interface device may be a luminous device, e.g. an electronic display or a LED array, or else an acoustic device, e.g. a buzzer or a voice synthesizer.

In order to improve the operation of the laundry washing or washing/drying machine, it is useful to measure the displacement of the oscillating assembly with respect to the frame. In fact, said measurement allows, in static conditions, to know certain characteristics of the load being present in the household appliance, whereas in dynamic conditions it allows to quantify the imbalance of the load inside the drum and/or the vibration of the oscillating assembly, or to determine the maximum admissible spin speed. Particularly interesting is the possibility of using the displacement of the oscillating assembly with respect to the frame in static conditions to obtain the mass or weight of the laundry contained in the drum, preferably the mass or weight of the laundry loaded in the drum by the user before starting a wash treatment.

A laundry washing or washing/drying machine according to the present invention comprises, in its suspension system, dampers connected to the oscillating assembly (i.e. to the tub assembly) through a top mount and to the frame through a bottom mount hinged to a pin, which dampers provide the fundamental function of damping the oscillations of the oscillating assembly, mostly during the spin phases. Said dampers comprise a sheath, i.e. a cylindrical tubular element, within which a rod, which typically is also a cylindrical tubular element, slides and is braked by an element capable of generating adequate friction between the outer surface of the rod and the inner surface of the sheath. Two different configurations are possible in regard to the installation of the dampers in the laundry washing or washing/drying machine: rod constrained to the oscillating assembly and sheath constrained to the frame, or sheath constrained to the oscillating assembly and rod constrained to the frame. The above two different configurations are wholly equivalent for the purposes of the present invention.

Figure 1:
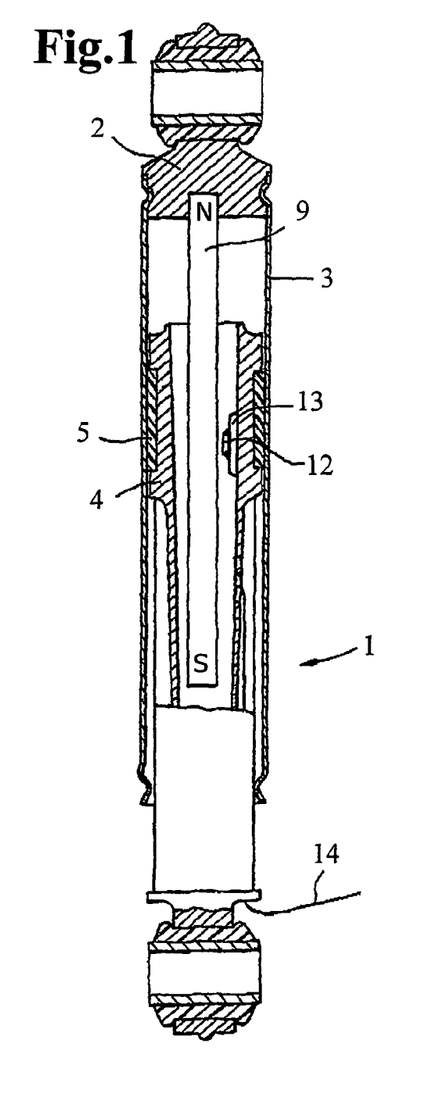
FIG. 1 shows a detail of a household appliance according to the present invention, more precisely a damper with an electronic module comprising at least one Hall element and adapted to be installed in a household appliance according to the present invention.

FIG. 1 illustrates a damper 1 adapted to be installed in a household appliance according to the present invention. The damper 1 comprises at least two elements, preferably the first element being the rod 4 and the second element being the sheath 3; said two elements are adapted to move reciprocally, in particular the first element being adapted to slide relative to the second element along an essentially straight sliding direction. A magnetic element, preferably a permanent magnet 9, is connected to either one of the two elements, while an electronic module 6 comprises at least one magnetic sensor, preferably at least one Hall element 12, which is connected to the other one of the two elements and is adapted to measure the relative displacement between the first element and the second element; as an alternative, the Hall element may be replaced with at least one Reed switch. The main axis of the permanent magnet 9 is essentially parallel to the sliding direction of the first element of the damper 1 relative to the second element of the damper 1.

In the damper 1 according to the present invention shown in FIG. 1, the permanent magnet 9 is connected to the sheath 3, whereas the electronic module 6 is connected to the rod 4. Without departing from the scope of the present invention, it could be possible to connect the permanent magnet 9 to the rod 4 and the electronic module 6 to the sheath 3.

On the outer surface of the rod 4 a braking element 5 is secured whose friction with the inner surface of the sheath 3 allows to dissipate, during the rotation of the drum of the laundry washing or washing/drying machine, a considerable quantity of energy, which is turned into heat. The braking element 5, adapted to generate adequate friction during the relative motion between the two main components of the damper 1, may likewise be mounted to the inner surface of the sheath 3. The sheath 3 is closed at the top by a closing element 2, which also works as a support for the permanent magnet 9 mounted inside the sheath 3, so that its main axis coincides, except for any mechanical tolerances, with the main axis of the damper 1. The two opposite polarities of the permanent magnet 9 are concentrated on the opposite ends of the permanent magnet 9: for example, it may be assumed that the north polarity N is located on the end of the permanent magnet 9 secured to the sheath 3, and that the south polarity S is located on the free end of the permanent magnet 9. On the inner surface of the rod 4 a strip 13 is mounted which is adapted to secure the electronic module 6 to the rod 4. Preferably, the strip 13 and/or the electronic module 6 are positioned along the inner surface of the rod 4 in such a way that the Hall element 12 turns out to be located in front of the central area of the permanent magnet 9, when the laundry washing or washing/drying machine is idle and there is no laundry inside the drum. The electronic module 6 is connected to the central controller 17 of the household appliance by means of a wiring 14 and is supplied electrically through the central controller 17. The embodiment of a damper according to the present invention shown in FIG. 1 may be modified, according to an alternative and wholly equivalent configuration, by mounting the strip 13 and the electronic module 6 on the inner surface of the sheath 3 and by constraining the permanent magnet 9 rigidly to the rod 4.

According to the present invention, the electronic module 6 comprises at least one magnetic sensor and one microcontroller 16 electrically connected to the magnetic sensor and to the electronic control system, in particular to the central controller 17; the microcontroller 16 is adapted to generate, through the magnetic sensor, at least one piece of information, in particular a piece of information being representative of the value of the displacement of the oscillating assembly with respect to the appliance frame, and to send said information to the electronic control system, in particular to the central controller 17, over a digital communication line; more precisely, the Hall element 12 generates an analog electric signal and sends it to the microcontroller 16, which in turn processes it and generates a digital signal which is then sent to the central controller 17.

The digital communication line between the microcontroller and the electronic control system uses suitable transmission means, typically electric means, and suitable communication signals and/or protocols.

Based on said information, the central controller 17 can therefore exert at least one control action on the household appliance. In particular, said information may be a measurement of the mass or weight of the contents of the oscillating assembly or of a portion of the contents of the oscillating assembly. More in particular, said information is the measurement of the mass or weight of the laundry loaded in the oscillating assembly before starting a wash treatment, or is the measurement of the mass or weight of the water or wash liquid being present inside the oscillating assembly during the operation of the household appliance.

Figure 2:
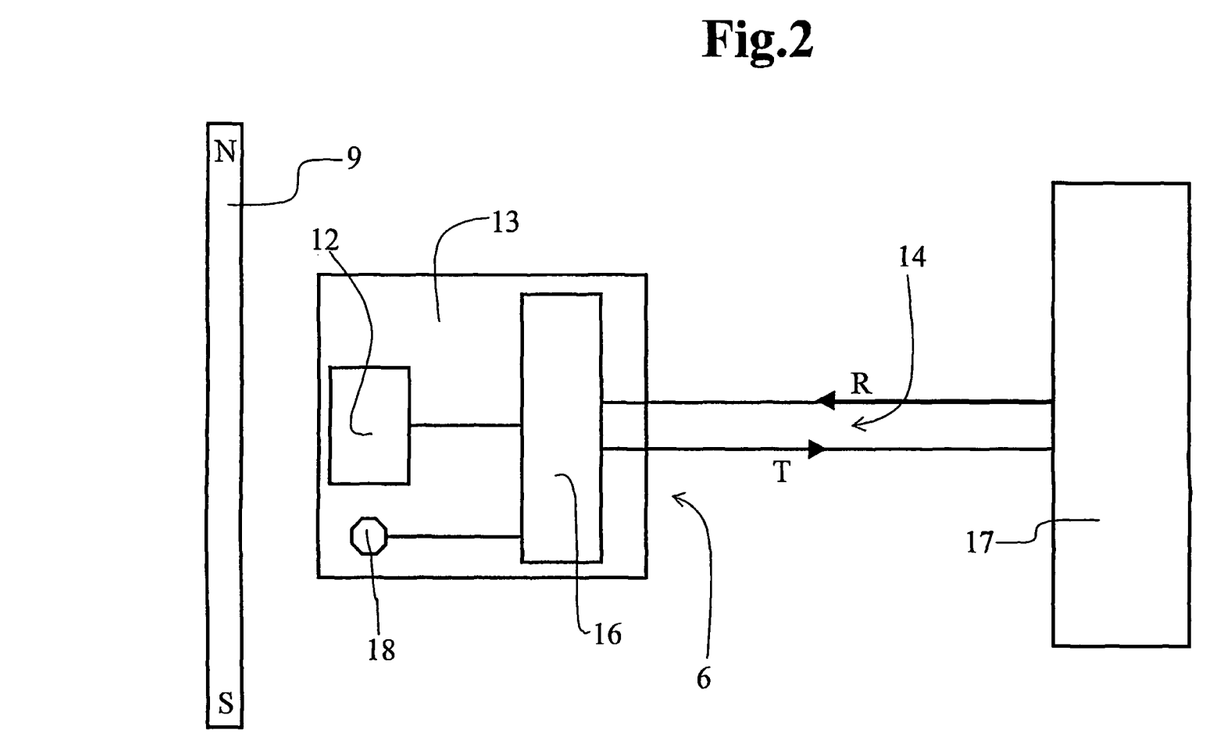
FIG. 2 is a block diagram of an electronic module comprising at least one Hall element, comprised within a household appliance according to the present invention.

FIG. 2 shows an electronic module 6 according to the present invention. It comprises at least one Hall element 12, which generates an electric signal depending on the position of the permanent magnet 9 relative to it, due to the well-known Hall effect, according to which current flows in a conductor if there is a magnetic field in the area where the conductor is located (the current being directed perpendicularly to the magnetic field).

Therefore, a variation in the position of the permanent magnet 9 relative to the Hall element 12 changes the amplitude of the electric signal emitted by the Hall element 12, so that said electric signal allows to quantify the displacement of the oscillating assembly with respect to the appliance frame as well as other quantities which can be detected through said displacement, among which, for example, the mass or weight of the laundry contained in the drum. The electronic module 6 comprises a microcontroller 16, which represents a slave unit of the central controller 17, whereto it is connected by means of the wiring 14.

The electronic module 6 is located near the Hall element 12 to ensure the utmost immunity to electric noise. The analog electric signal generated by the Hall element 12, possibly amplified through a suitable amplifier circuit, is applied to an input of the microcontroller 16 fitted with an analog/digital converter.

The microcontroller 16 is adapted to generate, through analog/digital conversion of the analog electric signal emitted by the Hall element 12, a digital signal being representative of the displacement of the oscillating assembly with respect to the frame and/or of other possible physical quantities related to said displacement, among which, for example, the mass or weight of the laundry contained inside the drum.

The microcontroller 16 is adapted to process the analog electric signal generated by the Hall element 12 in order to compensate for any errors possibly caused by external interferences, i.e. the microcontroller 16 subjects the analog electric signal received from the Hall element 12 to a digital processing step in order to compensate for any errors due to external environmental factors (e.g. temperature) or to wear of mechanical components of the suspension system of the household appliance.

Said compensation may take place based on signals sent by sensing devices (e.g. based on the output signal of a temperature probe 18 located close to the Hall element 12), or based on algorithms taking into account the variation of the elasticity and/or damping characteristics of the suspension system of the household appliance over time. More in detail, said algorithms consist of software procedures created on the basis of data acquired experimentally and adapted to counter the loss of accuracy and reliability over time of both the measurement of the displacement of the oscillating assembly with respect to the appliance frame and the measurement of any other physical quantities which can be obtained from said displacement.

In particular, the microcontroller 16 performs a calibration operation, after which it can associate any possible analog electric signal received from the Hall element 12 with a digital signal being representative of a particular value of displacement of the oscillating assembly with respect to the frame and/or of a particular value of one or more physical quantities related to said displacement (such as the mass or weight of the laundry contained inside the drum), which is sent to the central controller 17 by the microcontroller 16 over the communication line consisting of the wiring 14. It should be underlined that the digital transmission from the microcontroller 16 to the central controller 17 is much stronger than a simple analog connection between the Hall element 12 and the central controller 17, since it is essentially immune from noise and does not require any special shielding for the wiring 14 connecting the electronic module 6 to the central controller 17. This ensures high reliability and accuracy of the measurements carried out through the Hall element 12, such as the measurements of the displacement of the oscillating assembly with respect to the frame and the measurement of the mass or weight of the contents of the oscillating assembly.

According to a particularly advantageous embodiment of the present invention (shown in FIG. 2), the electronic module 6 also comprises the temperature probe 18 (which may preferably be an NTC-type probe), used for determining the value of the temperature in the position of the Hall element 12. During the operation of the household appliance, said area is in fact subject to the action exerted by the braking element 5, which dissipates a portion of the kinetic energy of the oscillating assembly as heat: in particular, said action of the braking element 5 of the damper 1 is felt as a temperature value being higher than room temperature, which may represent an input interfering with the system used to measure the displacement of the oscillating assembly with respect to the appliance frame. The temperature probe 18 generates an auxiliary electric signal being representative of the temperature in the position of the Hall element 12 and sends it to the microcontroller 16. The microcontroller 16 takes into account the auxiliary electric signal received from the temperature probe 18 for generating the information to be sent to the central controller 17 over a digital communication line.

The microcontroller 16 compensates the measured value of the displacement of the oscillating assembly with respect to the appliance frame (or of any physical quantity related to said displacement) based on the temperature value detected by the temperature probe 18, taking into account how the sensitivity characteristics of the output of the Hall element 12 change as a function of temperature.

Preferably, the microcontroller 16 may also be adapted to counter the effect exerted by variations over time of the elasticity and/or damping characteristics of the suspension system of the laundry washing or washing/drying machine on the analog electric signal generated by the Hall element 12. Such variations of the elasticity and/or damping characteristics take place as the number of operation cycles of the household appliance increases, and are caused by wear occurring over time. For example, if the electronic module 6 according to the present invention is to be used for detecting the mass or weight of the contents of the oscillating assembly of the laundry washing or washing/drying machine, it should be taken into consideration that, as time goes by, a different displacement of the oscillating assembly may occur for the same mass or weight inside the oscillating assembly. In this case, the microcontroller 16 may be made capable of compensating for the effect exerted by variations over time of the elasticity and/or damping characteristics of the suspension system of the laundry washing or washing/drying machine on the detection of the mass or weight of the contents of the oscillating assembly. To this end, the microcontroller 16 may, by way of non-limiting example, count the number of operation cycles carried out by the machine and then, based on said number, associate the signal received from the Hall element 12 with one of several experimentally obtained corrective factors, stored in the internal memory of the microcontroller 16. Thus, the microcontroller 16 performs a compensation action which allows to obtain a sufficiently precise and reliable measurement of the mass or weight of the contents of the oscillating assembly over time.

Compared to the measurement system described in patent DE4319614C1, the present invention offers the further advantage of significantly reducing the workload of the electronic control system of the household appliance, in particular of the central controller 17. In fact, the information sent by the microcontroller 16 of the electronic module 6 can be used by the central controller 17 directly, without requiring any further processing (since said processing has already been carried out upstream of the central controller 17). At most, the central controller 17 simply has to decode the digital signal sent by the microcontroller 16 to have the information contained therein available for controlling the household appliance.

The transmission of the above information from the microcontroller 16 to the central controller 17 may be provided by using well-known communication techniques. The communication between the microcontroller 16 and the central controller 17 by means of the wiring 14 may be a unidirectional communication (e.g. according to the PWM technique, wherein the information is coded by acting on the duty cycle of the digital signal, which therefore consists of a series of pulses having constant amplitude and frequency and variable width), or preferably a bidirectional communication (by way of non-limiting example, one may use a UART-type asynchronous serial bidirectional communication). Over the transmission line T the microcontroller 16 sends to the central controller 17, as a digital signal, the information relating to the value of the displacement of the oscillating assembly with respect to the appliance frame (or relating to any physical quantity related to said displacement), suitably compensated for temperature and wear of the mechanical components of the household appliance, whereas over the reception line R the microcontroller 16 receives from the central controller 17 data being significant for the microcontroller 16. For example, the central controller 17 may send to the microcontroller 16 the value of the rotation speed of the drum of the laundry washing or washing/drying machine, so that the microcontroller 16 can take it into account when estimating the variation over time of the elasticity and/or damping characteristics of the suspension system. Or, still by way of example, the central controller 17 may send to the microcontroller 16 information relating to the dynamic state of the system, so that the microcontroller 16 can more easily discern whether the ongoing measurement is a static measurement (such as a measurement of the mass or weight of the laundry contained in the drum before the wash treatment is started) or a dynamic measurement (such as a measurement of load imbalance during the operation of the household appliance).

The electronic module 6 may advantageously be used in a laundry washing or washing/drying machine according to the present invention to measure the mass or weight of the laundry loaded in the drum by the user, before subjecting it to a wash treatment; as an alternative, it may be used in a clothes dryer to measure the mass or weight of the laundry loaded in the drum by the user, before subjecting it to a drying treatment. In this case, the central controller 17 can use the information indicating the mass or weight of the laundry in order to calculate at least one parameter relating to the subsequent wash or drying treatment, said parameter preferably being the appropriate quantity of water, the appropriate quantity of wash agents, or the appropriate rotation speed. Like the information indicating the mass or weight of the laundry, said parameter may be communicated to the user through the interface device.

The information indicating the value of the mass or weight of the laundry may be used by the treatment machine both to provide useful information to the user through its interface device (e.g. the laundry washing or washing/drying machine may warn the user when the maximum laundry load which can be treated by the household appliance has been reached, depending on the type of fabric, or it may suggest the appropriate quantity of wash agents to be used for a certain quantity of laundry loaded in the drum, or it may give advice as to the most appropriate wash program) and to automatically adapt the characteristic parameters of the treatment, in particular of the wash treatment, to the quantity of laundry loaded in the drum by the user, so as to optimize the consumptions of the household appliance (if the laundry washing or washing/drying machine is fitted with a high-capacity wash agent dispensing device, knowing the value of the mass or weight of the laundry loaded in the drum will allow for an optimal metering of the wash agents).

In order that the electronic module 6 containing at least one magnetic sensor, in particular at least one Hall element 12, according to the present invention can carry out accurate and reliable measurements of the mass or weight of the contents of the oscillating assembly or of a portion thereof, the central controller 17 sends to the microcontroller 16 (assuming the existence of a bidirectional communication line between the two) at least one datum which can be used by the microcontroller 16 as a synchronism signal. If the measurement concerns the mass or weight of the laundry loaded in the drum of the laundry washing or washing/drying machine, it is useful to adopt a synchronism signal indicating an empty condition inside the oscillating assembly of the household appliance, which allows the microcontroller 16 to associate the offset detected when receiving the synchronism signal with the tare value. Said synchronism signal transforms the measurements of the mass or weight of the contents of the oscillating assembly of the laundry washing or washing/drying machine into differential measurements, the value of the mass or weight of the laundry loaded in the drum being therefore calculated by the microcontroller 16 as a difference between the mass or weight value corresponding to the electric signal generated instantaneously by the Hall element 12 and the mass or weight value corresponding to the electric signal generated by the Hall element 12 when the synchronism signal is sent. In the advantageous embodiment of the present invention using a bidirectional communication line between the central controller 17 and the microcontroller 16, the synchronism signal may be the signal indicating that the door of the laundry washing or washing/drying machine has been opened, which is sent to the microcontroller 16 by the central controller 17 after having received it from the door locking device. As an alternative, a dedicated calibration push-button may be provided inside the interface device, i.e. a push-button available to the user to indicate the empty condition inside the oscillating assembly to the central controller 17: in this case, the synchronism signal may be provided by a signal indicating that said push-button has been pressed.

By performing differential measurements, the electronic module 6 according to the present invention can also operate as a water or wash liquid quantity sensor. In fact, by using the start signal of the laundry washing or washing/drying machine as a synchronism signal once the laundry has been loaded in the drum, it is possible to measure the mass or weight of the water or wash liquid inside the oscillating assembly. In fact, the mass and weight of the water or wash liquid can be calculated by the microcontroller 16 as a difference between the mass or weight value obtained instantaneously during the operation of the laundry washing or washing/drying machine and the mass or weight value obtained when the synchronism signal is sent, i.e. when the laundry washing or washing/drying machine is started. By working as a water or wash liquid quantity sensor, the electronic module 6 allows the central controller 17 to control the water intake and/or drain means of the laundry washing or washing/drying machine (determining their opening and closing times) solely as a function of the information relating to the mass or weight of the water or wash liquid being present inside the oscillating assembly.

If the household appliance according to the present invention is a washing/drying machine, the electronic module 6 may also be used for controlling the drying treatment. During the drying treatment, the microcontroller 16 can transmit to the central controller 17, instant by instant, the information relating to the mass or weight of the oscillating assembly, and the central controller 17 can use said information to control the drying treatment. Likewise, the microcontroller 16 can determine the quantity of water progressively removed from the laundry by calculating it based on the reduction in the mass or weight of the contents of the oscillating assembly, and the central controller 17 can stop the drying treatment when the quantity of water removed from the laundry reaches a predetermined percentage of the quantity of water contained inside the oscillating assembly at the end of the wash treatment.

It is apparent from the present description that the household appliance according to the present invention, besides overcoming the above-mentioned inherent drawbacks of patent DE4319614C1, also offers the additional advantage of allowing to use the electronic module 6 comprising at least one magnetic sensor for controlling many operation phases of the household appliance without increasing the workload of the central controller 17.

Figure 3:
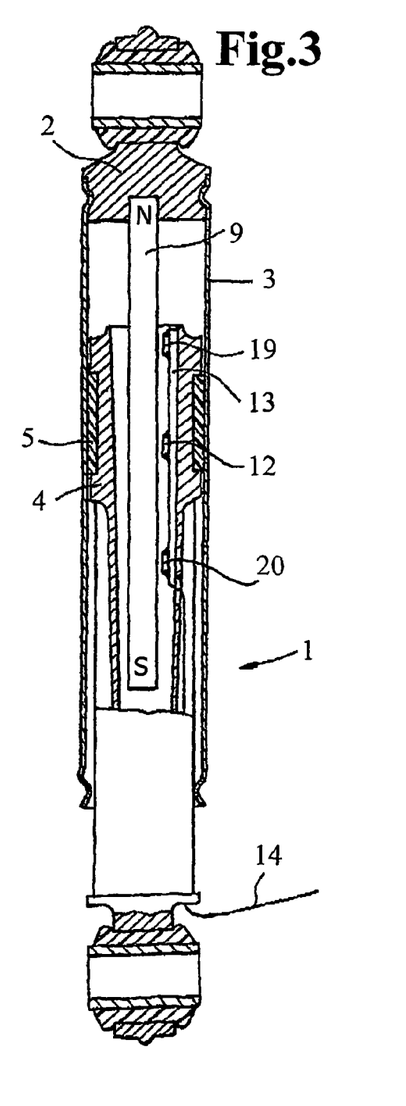
FIG. 3 shows the detail of the household appliance illustrated in FIG. 1, according to a possible variant of the present invention.

An interesting variant of the household appliance according to the present invention employs at least one additional magnetic sensor, in particular at least one additional Hall element, connected to the same element of the damper 1 as the electronic module 6 and electrically connected to the microcontroller 16. In this case, the microcontroller 16 of the electronic module 6 generates a piece of information, in particular a piece of information being representative of the value of the displacement of the oscillating assembly with respect to the appliance frame (which information may be, for example, the mass or weight of the contents of the oscillating assembly, which is then sent to the central controller 17 over a digital communication line) based on electric signals generated by two or more Hall elements, rather than only on the electric signal generated by the Hall element 12 contained in the electronic module 6. The Hall elements are arranged inside the damper in positions where they can detect the magnetic field generated by the permanent magnet, according to different configurations depending on the performance to be obtained from the measurement system (in terms of measurement range and accuracy) and on its complexity, which affects its implementation cost. A possible embodiment of said variant is illustrated in FIG. 3, which, by way of non-limiting example, also comprises, in addition to the Hall element 12 contained in the electronic module 6, two other Hall elements 19 and 20, applied to the same element of the damper 1 (sheath 4, as in FIG. 3, or rod) whereto the electronic module 6 is applied and electrically connected to the microcontroller 16, to which each one sends an analog electric signal generated by Hall effect (as an alternative, one may provide an electronic module 6 with two or more built-in Hall elements instead of just the Hall element 12). The Hall elements 19 and 20 are aligned in a direction being parallel to the main axis of the permanent magnet 9 and are preferably arranged symmetrically relative to the electronic module 6. The Hall elements are spaced appropriately so that the reading range of the entire measurement system is sufficiently wider than the reading range of the single Hall elements 12, 19 and 20 comprised in the measurement system.

It should be underlined that an architecture of a damper 1 (adapted to be installed in a household appliance, preferably in a laundry washing or washing/drying machine) such as the one shown in FIG. 3 is so innovative as to represent an invention itself. Said architecture is based on the general idea of using two or more magnetic sensors, preferably two or more Hall elements, associated with either one of the two elements of the damper 1; additionally and advantageously, one may also use a microcontroller and/or a temperature probe 18. In the non-limiting example shown in FIG. 3, the permanent magnet 9 is connected to the sheath 3, while the Hall elements 12, 19 and 20 are connected to the rod 4 (as an alternative, one may connect two or more Hall elements to the sheath 3 and the permanent magnet 9 to the rod 4), in order to detect the value of the displacement of the oscillating assembly with respect to the appliance frame (or of any physical quantity related to said displacement, such as the mass of the contents of the oscillating assembly). The analog electric signal generated by the single Hall elements 12, 19 and 20 may be sent directly to the central controller 17 of the household appliance, or else it may be sent to a local processing unit such as the previously described microcontroller 16.

The present invention has been described with particular reference to some specific embodiment examples, but it is clear that many changes may be made thereto by those skilled in the art without departing from the scope defined by the annexed claims.

The invention claimed is:

1. A household appliance for treating soft goods, being a washing or washing/drying machine, said household appliance being of an electronically controlled type fitted with an electronic control system and comprising:
   a frame and an oscillating assembly,
   a suspension system connecting said oscillating assembly to said frame, said suspension system comprising at least one damper, said damper comprising at least two elements adapted to move reciprocally, at least one magnetic element, having at least one permanent magnet, and an electronic module provided with at least one magnetic sensor, said magnetic element and said magnetic sensor being housed in said damper so as to detect reciprocal motion of said at least two elements, and
   said electronic module further comprising a microcontroller located on the damper, electrically connected to said magnetic sensor and to said electronic control system, said microcontroller being configured to locally process an analog signal of said magnetic sensor to at least compensate for effects associated with variations over time in elasticity and/or damping characteristics of said suspension system, and the microcontroller being configured to generate at least one piece of information, from the compensated analog signal, being representative of a value of displacement of said oscillating assembly with respect to said frame, and the microcontroller further configured to send said at least one piece of information as a digital signal to said electronic control system over a digital communication line.

2. The household appliance according to claim 1 wherein said magnetic sensor is a Hall element.

3. The household appliance according to claim 1 wherein said electronic control system is adapted to exert at least one control action on said household appliance based on said information.

4. The household appliance according to claim 1 wherein said information is a measurement of a mass or weight of contents of said oscillating assembly or of a portion of said contents of said oscillating assembly.

5. The household appliance according to claim 4 wherein said information is a measurement of a mass or weight of soft goods loaded in said oscillating assembly before subjecting said soft goods to a treatment.

6. The household appliance according to claim 5 wherein said electronic control system is adapted to use said information to calculate at least one parameter relating to a subsequent wash treatment, said parameter being a quantity of water or a quantity of wash agents.

7. The household appliance according to claim 6 further comprising an interface device adapted to communicate said information and/or said parameter to a user.

8. The household appliance according to claim 4 wherein said information is further the measurement of a mass or weight of water or wash liquid being present inside of said oscillating assembly during operation of said household appliance.

9. The household appliance according to claim 8 further comprising water intake and/or drain means, and said electronic control system controlling said water intake and/or drain means based on said information.

10. The household appliance according to claim 4 said household appliance being adapted to carry out at least one drying treatment on soft goods, and said electronic control system using said information to control said drying treatment.

11. The household appliance according to claim 1 wherein said microcontroller is adapted to process said analog signal generated by said magnetic sensor in order to compensate for errors caused by interferences.

12. The household appliance according to claim 1 wherein said electronic module further comprises a temperature probe.

13. The household appliance according to claim 12 wherein said temperature probe is adapted to generate and send to said microcontroller an auxiliary electric signal being representative of a temperature value associated with a position of said magnetic sensor, and said microcontroller is adapted to take into account said auxiliary electric signal for generating said information.

14. The household appliance according to claim 1 wherein communication between said microcontroller and said electronic control system is a bidirectional communication.

15. The household appliance according to claim 14 wherein said electronic control system is further adapted to send to said microcontroller at least one datum being significant for said microcontroller, which can be used by said microcontroller as a synchronism signal.

16. The household appliance according to claim 15 further comprising a door and a door locking device electrically connected to said electronic control system and said datum used by said microcontroller as a synchronism signal indicating that said door has been opened.

17. The household appliance according to claim 15 further comprising an interface device, said interface device comprising a push-button, said push-button being adapted to allow a user to indicate to said electronic control system an empty condition of said oscillating assembly, and that said datum used by said microcontroller as a synchronism signal indicates that said push-button has been pressed.

18. The household appliance according to claim 15 wherein said datum used by said microcontroller as a synchronism signal indicates that said household appliance has been started.

19. The household appliance according to claim 1 further comprising at least one additional magnetic sensor housed in said damper to detect the reciprocal motion of said at least two elements, said at least one additional magnetic sensor being electrically connected to said microcontroller.

20. The household appliance according to claim 19 wherein said magnetic sensors are so spaced as to be able to detect a wider range of reciprocal motion of said at least two elements.

21. The household appliance according to claim 12 wherein said temperature probe is an NTC type probe.

22. The household appliance according to claim 14 wherein said bidirectional communication is a UART-type-asynchronous serial bidirectional communication.

23. A damper adapted to be installed in a household appliance for treating soft goods in a laundry washing or washing/drying machine, said damper comprising at least two elements adapted to move reciprocally, a first of said at least two elements being a rod and a second of said at least two elements being a sheath, at least one magnetic element, having at least one permanent magnet, being mechanically connected to either one of said at least two elements, and two or more magnetic sensors mechanically connected to the other one of said at least two elements, said damper further comprising at least one microcontroller on the damper electrically connected to said two or more magnetic sensors, said microcontroller being configured to locally process the signals from said two or more magnetic sensors to at least compensate the signals for effects associated with variations over time in elasticity and/or damping characteristics of said suspension and to produce, from the compensated signals, digital signals for communications to an appliance electronic controller over a digital communications line.

24. The damper according to claim 23 wherein said magnetic sensors are Hall elements.

25. The household appliance according to claim 1 wherein the microcontroller is further configured to count a number of operations cycles carried out by the household appliance, the microcontroller configured to use the count to associate the analog signal with corrective factors to further compensate the analog signal.

* * * * *

UNITED STATES PATENT AND TRADEMARK OFFICE
CERTIFICATE OF CORRECTION

| | | |
|---|---|---|
| PATENT NO. | : 8,991,221 B2 | Page 1 of 3 |
| APPLICATION NO. | : 11/991817 | |
| DATED | : March 31, 2015 | |
| INVENTOR(S) | : Valerio Aisa et al. | |

It is certified that error appears in the above-identified patent and that said Letters Patent is hereby corrected as shown below:

In the Claims:
Claim 1, Col. 10, lines 33-54 should read:
1. A household appliance for treating soft goods, being a
washing machine or a washing/drying machine, said household appli-
ance being of an electronically controlled type fitted with an
electronic control system and comprising:
a frame and an oscillating assembly;
a suspension system connecting said oscillating assembly
to said frame, said suspension system comprising at least
one damper, said at least one damper including at least two ele-
ments adapted to move reciprocally, at least one mag-
netic element, having at least one permanent magnet,
and an electronic module provided with at least one
magnetic sensor, said at least one magnetic element and said at least one mag-
netic sensor being housed in said damper so as to detect
reciprocal motion of said at least two elements; and
said electronic module including a microcontroller
located on the at least one damper, electrically connected to said
at least one magnetic sensor and to said electronic control system,
said microcontroller being configured to locally process
an analog signal of said at least one magnetic sensor to at least
compensate for effects associated with variations over
time in elasticity and/or damping characteristics of said
suspension system to produce a compensated analog signal, and the microcontroller being further con- Claim 2, Col. 10, line 63 should read:
said at least one magnetic sensor is a Hall element.

Signed and Sealed this
Eighth Day of September, 2015

Michelle K. Lee
*Director of the United States Patent and Trademark Office*

CERTIFICATE OF CORRECTION (continued)
U.S. Pat. No. 8,991,221 B2

In the Claims:
Claim 3, Col. 10, line 67 should read:
<u>at least one piece of</u> information.

Claim 4, Col. 11, line 2 should read:
said <u>at least one piece of</u> information is a measurement of mass or weight of Claim 5, Col. 11, line 6 should read:
said <u>at least one piece of</u> information is a measurement of a pass or weight of <u>said</u> soft Claim 6, Col. 11, line 10 should read:
said electronic control system is configured to use said <u>at least one piece of</u> informa- Claim 6, Col. 11, line 12 should read:
quent wash treatment, said <u>at least one</u> parameter being a quantity of Claim 7, Col. 11, lines 15-16 should read:
comprising an interface device configured to communicate said <u>at least one piece of</u>
information and/or said <u>at least one</u> parameter to a user.

Claim 8, Col. 11, line 18 should read:
said <u>at least one piece of</u> information is further the measurement of a mass or Claim 9, Col. 11, lines 24-25 should read:
tronic control system configured to control said water intake and/or
drain means based on said <u>at least one piece of</u> information.

Claim 10, Col. 11, lines 27-29 should read:
household appliance configured to carry out at least one
drying treatment on <u>said</u> soft goods, and said electronic control
system using said <u>at least one piece of</u> information to control said <u>at least one</u> drying treat- Claim 11, Col. 11, lines 32-33 should read:
said microcontroller is configured to process said analog signal
generated by said <u>at least one</u> magnetic sensor in order to compensate for Claim 13, Col. 11, line 39 should read:
wherein said temperature probe is configured to generate and Claim 13, Col. 11, lines 42-44 should read:
tion of said <u>at least one</u> magnetic sensor, and said microcontroller is
further configured to take into account said auxiliary electric signal for
generating said <u>at least one piece of</u> information.

CERTIFICATE OF CORRECTION (continued)
U.S. Pat. No. 8,991,221 B2

In the Claims:

Claim 15, Col. 11, line 49 should read:
wherein said electronic control system is further configured to Claim 17, Col. 12, lines 4-5 should read:
comprising an interface device, said interface device
including a push-button, said push-button configured to Claim 20, Col. 12, line 20 should read:
wherein said <u>at least one</u> magnetic sensor <u>and at least one additional magnetic sensor</u> are so spaced as to be able to Claim 23, Col. 12, lines 30-42 should read:
drying machine, said damper comprising<u>:</u> at least two elements adapted to move reciprocally; a first of said at least two elements being a rod and a second of said at least two elements being a sheath; at least one magnetic element having at least one permanent magnet, being mechanically connected to either one of said at least two elements; two or more magnetic sensors mechanically connected to the other one of said at least two elements; and at least one microcontroller on the damper electrically connected to said two or more magnetic sensors, said microcontroller being configured to locally process the signals from said two or more magnetic sensors to at least compensate the signals<u>, to produce compensated signals,</u> for effects associated with variations over time in Claim 24, Col. 12, line 47 should read:
24. The clamper according to claim 23 wherein said <u>two or more</u> mag- Claim 25, Col. 12, line 52 should read:
microcontroller <u>further</u> configured to use the count to associate the